United States Patent
Channakeshava

(10) Patent No.: US 8,924,393 B1
(45) Date of Patent: Dec. 30, 2014

(54) METHOD AND SYSTEM FOR IMPROVING AUTOMATIC CATEGORIZATION OF FINANCIAL TRANSACTIONS

(75) Inventor: Girish Mallenahally Channakeshava, Bangalore (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 13/193,445

(22) Filed: Jul. 28, 2011

(51) Int. Cl.
*G06F 17/30* (2006.01)

(52) U.S. Cl.
USPC .......................................... 707/738; 707/950

(58) Field of Classification Search
CPC .......... G06F 17/3053; G06F 17/30749; G06F 17/30867
USPC ......... 707/736, 737, 738, 950; 705/14.17, 35, 705/30
See application file for complete search history.

(56) References Cited

U.S. PATENT DOCUMENTS

| | | | |
|---|---|---|---|
| 5,530,438 A * | 6/1996 | Bickham et al. | 340/5.8 |
| 5,559,313 A * | 9/1996 | Claus et al. | 705/30 |
| 5,737,440 A | 4/1998 | Kunkler | |
| 5,796,868 A | 8/1998 | Dutta-Choudhury | |
| 5,878,337 A * | 3/1999 | Joao et al. | 455/406 |
| 6,167,378 A | 12/2000 | Webber, Jr. | |
| 6,574,600 B1 | 6/2003 | Fishman et al. | |
| 6,908,031 B2 * | 6/2005 | Seifert et al. | 235/379 |
| 7,376,618 B1 | 5/2008 | Anderson et al. | |
| 7,970,701 B2 | 6/2011 | Lewis et al. | |
| 8,073,759 B1 | 12/2011 | Del Favero et al. | |
| 8,121,950 B2 | 2/2012 | Hassanein et al. | |
| 8,170,932 B1 | 5/2012 | Krakowiecki et al. | |
| 8,175,897 B2 | 5/2012 | Lee et al. | |
| 8,204,809 B1 | 6/2012 | Wise | |
| 8,234,195 B1 | 7/2012 | Berhanu et al. | |
| 8,244,629 B2 | 8/2012 | Lewis et al. | |
| 8,254,535 B1 | 8/2012 | Madhavapeddi et al. | |
| 8,499,046 B2 | 7/2013 | Zheng | |
| 2002/0128917 A1 * | 9/2002 | Grounds | 705/26 |
| 2003/0061132 A1 * | 3/2003 | Yu et al. | 705/30 |
| 2003/0182218 A1 | 9/2003 | Blagg | |
| 2004/0078328 A1 * | 4/2004 | Talbert et al. | 705/40 |
| 2004/0083134 A1 | 4/2004 | Spero et al. | |
| 2004/0111371 A1 | 6/2004 | Friedman | |
| 2005/0080649 A1 | 4/2005 | Alvarez et al. | |
| 2005/0267840 A1 | 12/2005 | Holm-Blagg et al. | |
| 2006/0031123 A1 * | 2/2006 | Leggett et al. | 705/26 |

(Continued)

OTHER PUBLICATIONS

Channakeshava, "Method and System for Automatically Obtaining and Categorizing Cash Transaction Data Using a Mobile Computing System," U.S. Appl. No. 13/272,946, filed Oct. 13, 2011.

(Continued)

*Primary Examiner* — Shiow-Jy Fan
(74) *Attorney, Agent, or Firm* — Hawley Troxell Ennis & Hawley LLP; Philip McKay

(57) ABSTRACT

A system and method for improving the accuracy of the automatic categorization of financial transactions provides a flexible and comprehensive approach to the automatic categorization of financial transactions whereby the payee data associated with the financial transaction and one or more of: data indicating the transaction amount, and how products and/or services of various kinds are typically priced; data indicating the time associated with the transaction; data indicating the time intervals between related transactions; and data indicating the transaction amount as compared to pricing data associated with the payee of the transaction, is analyzed to determine a financial category to automatically apply to the financial transactions.

20 Claims, 2 Drawing Sheets

(56) References Cited

U.S. PATENT DOCUMENTS

| | | |
|---|---|---|
| 2006/0036543 A1 | 2/2006 | Blagg et al. |
| 2006/0196930 A1 | 9/2006 | Hart et al. |
| 2008/0140505 A1* | 6/2008 | Romano et al. ................ 705/10 |
| 2008/0140576 A1 | 6/2008 | Lewis et al. |
| 2008/0208693 A1 | 8/2008 | Milstein et al. |
| 2008/0222037 A1 | 9/2008 | Foss et al. |
| 2008/0222054 A1 | 9/2008 | Blagg et al. |
| 2009/0030692 A1 | 1/2009 | Deligne et al. |
| 2009/0037461 A1* | 2/2009 | Rukonic et al. .......... 707/103 R |
| 2009/0094182 A1 | 4/2009 | Najarian et al. |
| 2009/0222364 A1* | 9/2009 | McGlynn et al. ............... 705/30 |
| 2009/0300068 A1 | 12/2009 | Tang |
| 2009/0307136 A1 | 12/2009 | Hawkins |
| 2009/0321522 A1 | 12/2009 | Lohr et al. |
| 2009/0327134 A1 | 12/2009 | Carlson et al. |
| 2010/0138328 A1 | 6/2010 | Venturo et al. |
| 2010/0169216 A1 | 7/2010 | Smith et al. |
| 2010/0217691 A1 | 8/2010 | Gillin et al. |
| 2010/0287099 A1 | 11/2010 | Liu et al. |
| 2011/0029396 A1 | 2/2011 | Sobek |
| 2011/0093324 A1 | 4/2011 | Fordyce et al. |
| 2011/0112869 A1 | 5/2011 | Greak |
| 2011/0225637 A1 | 9/2011 | Counterman |
| 2011/0264543 A1 | 10/2011 | Taveau et al. |
| 2011/0282778 A1 | 11/2011 | Wright et al. |
| 2011/0302011 A1 | 12/2011 | Yoder et al. |
| 2012/0047052 A1 | 2/2012 | Patel |
| 2012/0130796 A1 | 5/2012 | Busch |
| 2012/0143772 A1 | 6/2012 | Abadir |
| 2012/0315881 A1 | 12/2012 | Woloshyn |
| 2013/0051610 A1 | 2/2013 | Roach et al. |
| 2013/0124263 A1 | 5/2013 | Amaro et al. |
| 2013/0318446 A1 | 11/2013 | Ghotgalkar et al. |

OTHER PUBLICATIONS

Madhani, "Method and System for Semi-Automated Setup of Accounts within a Data Management System," U.S. Appl. No. 13/416,966, filed Mar. 9, 2012.

Madhani, "Method and System for Automated Classification and Categorization of Hardcopy Financial Transaction Records," U.S. Appl. No. 13/456,383, filed Apr. 26, 2012.

Rukonic et al., "Method and System for Identifying a Merchant Payee Associated with a Cash Transaction," U.S. Appl. No. 13/653,083, filed Oct. 16, 2012.

Channakeshava, "Method and System for Automatic Classification of Check and Cash Transactions by a Financial Management System," U.S. Appl. No. 13/752,041, filed Jan. 28, 2013.

Channakeshava, "Method and System to Simplify the Financial Institution Discovery and Add Accounts Processes for Data Management Systems," U.S. Appl. No. 13/459,505, filed Apr. 30, 2012.

Whittam et al., "Method and System for Utilizing Location Data for Automatic Categorization of Financial Transactions," U.S. Appl. No. 13/149,776, filed May 31, 2011.

Bhattacharyya et al., "Method and System for Automatic Categorization of Check-Based Financial Transactions," U.S. Appl. No. 13/350,517, filed Jan. 13, 2012.

* cited by examiner

METHOD AND SYSTEM FOR IMPROVING AUTOMATIC CATEGORIZATION OF FINANCIAL TRANSACTIONS

BACKGROUND

Currently, several financial management systems are available to obtain a user's financial data, process/analyze the user's financial data, and generate various reports for the user.

Financial management systems typically help users manage their finances by providing a centralized interface with banks, credit card companies, and various other financial institutions, for electronically identifying and categorizing user financial transactions.

Typically a financial management system's ability to identify and categorize specific financial transactions is what allows the financial management system to provide many of the features that are of most interest/use to users. Typically, the ability to categorize specific financial transactions is, in turn, dependent on an ability of the financial management system to obtain, and properly analyze, the data necessary to identify and categorize specific financial transactions.

Using some currently available financial management systems payee data associated with a specific financial transaction is used by the financial management system to propose, and/or apply, a category for a specific financial transaction automatically. As an example, if a given transaction includes data indicating a casino or hotel is the payee, a currently available financial management system will typically automatically apply a category of "entertainment" or "travel" to the financial transaction based solely on the payee being a location many people go to for entertainment, or when travelling.

While this type of currently available automatic categorization of a financial transaction based on payee name can be effective, the accuracy and/or reliability of such a categorization system is limited by the fact that the payee associated with a given financial transaction can be misleading.

For example, continuing with the example above, while the payee associated with a financial transaction may be a casino, since many people staying at a casino often enjoy other activities such as a spa, beauty salon, food, or cocktail bars, it is quite possible the transaction actually involved "food" or a "spa". Consequently, these financial transactions could easily be incorrectly categorized using current methods and systems for automatic categorization of a financial transaction.

As another example, while the payee associated with a transaction may be a hotel, and would therefore likely be categorized as "lodging" or "travel" using current methods and systems for automatic categorization of a financial transaction, other types of transactions are possible at a hotel since many hotels offer cafes, safe deposit lockers, shopping, arcades, babysitting, beauty parlors, movies, and various other products and/or services. Since when these other products and/or services are utilized the financial transaction still shows the hotel as the payee, these transactions are often incorrectly categorized using current methods and systems for automatic categorization of a financial transaction.

As another example, while the payee associated with a transaction may be a movie theater, the transaction may not actually be an "entertainment" transaction, but instead, may be a "food" transaction associated with a candy, soft drink, popcorn, or other food item purchase made at the theater.

As shown above, some payee names are misleading to currently available automatic categorization systems and can easily confuse these currently available automatic categorization systems.

As a result of the current situation, and the limitations of currently available automatic categorization systems, while the automatic methods of categorization of financial transactions currently available may be of some use, they are often inaccurate and fail to reliably categorize many financial transactions. Unfortunately, in most cases, it takes more user data entry and time to correct an incorrect automatic categorization of a given financial transaction than it would have taken to manually enter the correct categorization of the financial transaction in the first place. This is a particularly problematic situation given that research has shown that users are far more likely to adopt, and continue to use, a financial management system if the amount of manual data entry, i.e., data entry made via any user interface device, is minimized. Consequently, it is highly desirable to eliminate as many incorrect automatic categorizations of financial transactions as is possible for at least this reason. In addition, anytime correction of an automatic categorization of financial transaction is required, there is an opportunity for error introduction. Consequently, for this reason as well, it is highly desirable to minimize incorrect automatic categorizations of financial transactions.

SUMMARY

In accordance with one embodiment, a system and method for improving the accuracy of the automatic categorization of financial transactions includes a process for improving the accuracy of the automatic categorization of financial transactions whereby a flexible and comprehensive approach to the automatic categorization of financial transactions is employed.

In accordance with one embodiment, the process for improving the accuracy of the automatic categorization of financial transactions obtains financial transaction data associated with one or more financial transactions conducted by a user from one or more sources. In one embodiment, the financial transaction data includes data indicating, but not limited to, one or more of the following: the amount of the transaction; the payee of the transaction; the date of the transaction; the time of the transaction; the location of the transaction; and/or any other data associated with the transaction desirable and obtainable.

In accordance with one embodiment, the process for improving the accuracy of the automatic categorization of financial transactions then analyses the financial transaction data. As part of the analysis, the process for improving the accuracy of the automatic categorization of financial transactions uses not only the payee data associated with the financial transaction but also one or more secondary categorization parameters such as, but not limited to: data indicating the transaction amount, and data indicating how products and/or services of various kinds are typically priced; data indicating the time associated with the transaction, such as evening, daytime, weekend, weekday, or during, or after, business hours; data indicating the time intervals between related transactions, and/or transactions having the same payee; data indicating the type of business payee, such as a large resort vs. a small hotel; and data indicating the transaction amount as compared with data indicating the prices of products and/or services offered by the business payee, as obtained from a merchant database accessible by the process for improving the accuracy of the automatic categorization of financial transactions.

In one embodiment, as a result of this more comprehensive analysis using the secondary categorization parameters, the process for improving the accuracy of the automatic categorization of financial transactions determines a financial category to apply to the financial transactions and then transforms data indicating the category of the financial transactions into data indicating a financial category indicated by the results of the analysis.

Using the system and method for improving the accuracy of the automatic categorization of financial transactions disclosed herein, a flexible and comprehensive approach to the automatic categorization of financial transactions is employed. As a result, using the system and method for improving the accuracy of the automatic categorization of financial transactions disclosed herein, automatic categorizations of financial transactions are more likely to be accurate. Consequently, using the system and method for improving the accuracy of the automatic categorization of financial transactions disclosed herein, the numerous issues associated with incorrect automatic categorization of financial transactions, and correction of incorrect categorization of financial transactions, are avoided.

Figure 1:
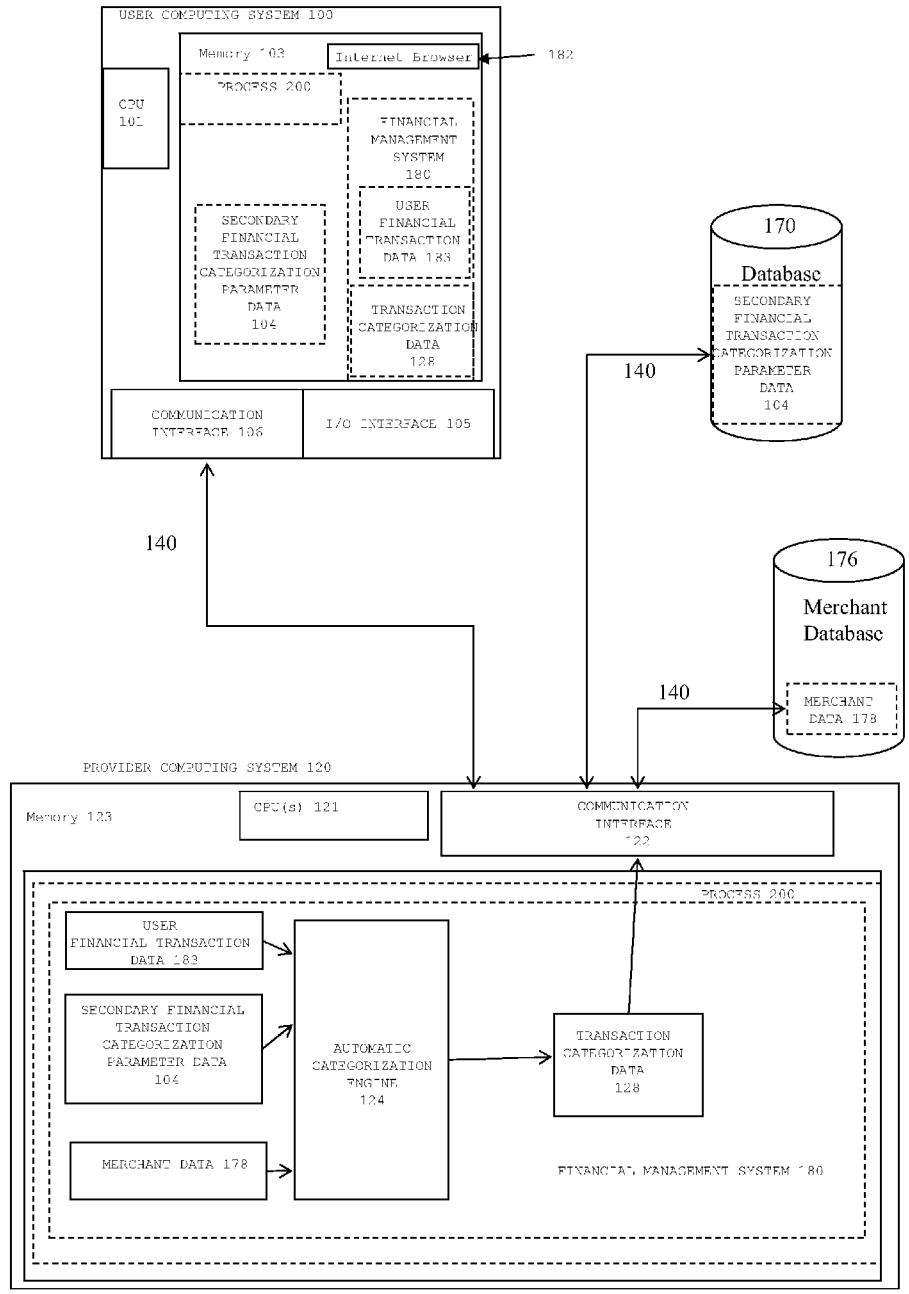
FIG. 1 is a block diagram of an exemplary hardware architecture for implementing one embodiment.

Common reference numerals are used throughout the FIG.s and the detailed description to indicate like elements. One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for improving the accuracy of the automatic categorization of financial transactions includes a process for improving the accuracy of the automatic categorization of financial transactions whereby a flexible and comprehensive approach to the automatic categorization of financial transactions is employed.

In accordance with one embodiment, secondary financial transaction categorization parameters are defined/determined that are to be used in conjunction with the payee data associated with a financial transaction to automatically categorize a financial transaction.

In accordance with one embodiment, the secondary financial transaction categorization parameters are defined/determined by the provider of the system and method for improving the accuracy of the automatic categorization of financial transactions. In accordance with one embodiment, a list of secondary financial transaction categorization parameters are defined/determined by the provider of the system and method for improving the accuracy of the automatic categorization of financial transactions and the list of secondary financial transaction categorization parameters is shown to the user. One or more of the secondary financial transaction categorization parameters are then selected by the user. In accordance with one embodiment, secondary financial transaction categorization parameters are defined/determined by the user of the system and method for improving the accuracy of the automatic categorization of financial transactions.

In various embodiments, the secondary financial transaction categorization parameters include, but are not limited to, a secondary financial transaction categorization generalized pricing parameter that determines automatic categorization of a financial transaction based, at least in part, on the amount of the financial transaction and how products and/or services of various kinds in various categories are typically priced. For instance, in one embodiment, the secondary financial transaction categorization generalized pricing parameter dictates that transactions having a resort/casino/hotel as a payee and having "cents" are categorized as a food expense because food prices normally have cents such as $8.95, $9.95, etc. as opposed to $9.00 or $10.00.

In various embodiments, the secondary financial transaction categorization parameters include, but are not limited to, a secondary financial transaction categorization occurrence frequency parameter that determines automatic categorization of a financial transaction based, at least in part, on the number of transactions having the same payee in a defined timeframe and/or the amounts of the transactions. For instance, in one embodiment, if ten transactions are found with the same resort/casino/hotel payee in the same evening for approximately the same amount, then these ten financial transactions are categorized as entertainment transactions based on the assumption that the ten transactions for the same amount represent a user taking part in the same entertainment event multiple times, such as buying gambling chips at a casino or playing a game in an arcade that is part of a resort/hotel/casino, or even buying multiple cocktails at the resort/hotel/casino bar. As another specific example, if ten transactions are found with the same resort/casino/hotel payee in the same evening and if nine of the ten transactions have same amount, but the remaining one transaction has a different amount then, in one embodiment, the secondary financial transaction categorization occurrence frequency parameter determines that the nine transactions are to be automatically categorized as entertainment, based on the assumption above, and that the tenth transaction be automatically categorized as food, of some other service related category.

In various embodiments, the secondary financial transaction categorization parameters include, but are not limited to, a secondary financial transaction categorization known pricing parameter that determines automatic categorization of a financial transaction based, at least in part, on known pricing/pricing associated with a given payee. In these embodiments, a merchant database is created that includes, but is not limited to, a listing of items/services provided by various merchants/payees and/or the prices the merchants/payees charge for their items/services.

For instance in one example, in one embodiment, a merchant database is created that includes a local theater and the price charged by the local theater for various types of tickets. Then, in this example, if a financial transaction includes the local theater as the payee, the amount of the financial transaction is obtained and compared with the secondary financial transaction categorization known pricing parameter data, i.e., the known ticket pricing data for the theater. In one embodiment, in this illustrative example, if the amount associated with the financial transaction is equal to the amount of a ticket, a combination of ticket amounts, or the multiple of a ticket amount or combination of ticket amounts, the financial transaction is automatically categorized as "Entertainment". If the amount of the financial transaction is not equal to the amount of a ticket, a combination of ticket amounts, or the multiple of a ticket amount or combination of ticket amounts, the financial transaction is automatically categorized as "food"; food being the only other items offered by the theater.

In various embodiments, the secondary financial transaction categorization parameters include, but are not limited to, a secondary financial transaction categorization known services parameter that determines the automatic categorization of a financial transaction based, at least in part, on known services associated with a given payee. In these embodiments, a merchant database is again created that includes, but is not limited to, a listing of items/services provided by various merchants/payees.

In one illustrative example, if several financial transactions have a payee that is a hotel/resort/casino, and one transaction is for a relatively large amount such as $250.00 and the others are for relatively smaller amounts, then, in this specific example, the merchant database would be searched for services offered by the payee hotel/resort/casino. In this example, if the merchant database indicates the payee hotel/resort/casino offers only rooms and a restaurant, then the $250.00 is automatically categorized as "lodging" and the other transactions are automatically categorized as "food".

In various embodiments, other secondary financial transaction categorization parameters are defined/determined and any combination of two or more of the above secondary financial transaction categorization parameters, and/or other secondary financial transaction categorization parameters, are used to determine the automatic categorization to be applied to a financial transaction as discussed below.

In one embodiment, data representing the defined/determined secondary financial transaction categorization parameters is stored in whole, or in part, in one or more memory systems, and/or cache memories, and/or any database, associated with one or more computing systems.

As used herein, a memory refers to a volatile memory, a non-volatile memory, or any combination of the two.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In one embodiment, financial transaction data associated with one or more financial transactions conducted by a user is obtained from one or more sources.

In one embodiment, the financial transaction data includes data indicating, but not limited to, one or more of the following: the payee of the transaction; the amount of the transaction; data related to the secondary financial transaction categorization parameters; the date of the transaction; the time of the transaction; the location of the transaction; and/or any other data associated with the transaction desirable and obtainable.

In one embodiment, the financial transaction data is obtained from a user computing system. As used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

In one embodiment, the financial transaction data is obtained from a user mobile device. Herein, the term "mobile computing system" and "mobile device" are used interchangeably and include, but are not limited to: a portable computer; a two-way pager; a cellular telephone; a smart phone; a digital wireless telephone; a Personal Digital Assistant (PDA); a media player, i.e., an MP3 player and/or other music and/or video player; an Internet appliance; or any other mobile device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; smart phones; digital telephones; two-way pagers; PDAs; media players; or any desired combination of these devices and/or computing systems, that are coupled to perform the processes and/or operations as described herein.

In one embodiment, one or more mobile computing systems are connected by one or more mobile communication networks such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In one embodiment, access to at least part of the financial transaction data is obtained through, or from, one or more financial institutions, such as, but not limited to, banks, credit card companies, asset account providers, mortgage companies, retirement account providers and various other financial and asset management institutions. In one embodiment, access to at least part of the financial transaction data is obtained through, or from, one or more financial institution websites, financial institution databases, and/or any other financial data sources as discussed herein, and/or as known in the art at the time of filing, and/or as developed after the time of filing.

In one embodiment, access to at least part of the financial transaction data is obtained through, or from, one or more financial management systems that implement, include, are accessible by, and/or are otherwise associated with, the process for improving the accuracy of the automatic categorization of financial transactions.

Herein, a financial management system can be, but is not limited to, any data management system implemented on a computing system and/or accessed through a network that gathers financial data, including financial transactional data, from one or more sources and/or has the capability to analyze and categorize at least part of the financial data.

As used herein, the term financial management system includes, but is not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filling or as developed later.

Specific examples of financial management systems include, but are not limited to: Quicken™, available from Intuit, Inc. of Mountain View, Calif.; Quicken On-Line™, available from Intuit, Inc. of Mountain View, Calif.; QuickBooks™, available from Intuit, Inc. of Mountain View, Calif.; QuickBooks On-Line™, available from Intuit, Inc. of Mountain View, Calif.; Mint™, available from Intuit, Inc. of Mountain View, Calif.; Quicken Health Expense Manager™, available from Intuit, Inc. of Mountain View, Calif.; Microsoft Money™, previously available from Microsoft, Inc. of Redmond, Wash.; and/or various other financial management systems discussed herein, and/or known to those of skill in the art at the time of filing, and/or as developed after the time of filing.

Current financial management systems are typically software applications which, along with a parent computing system or device, help individuals/users manage their finances by providing a centralized interface with banks, credit card companies, asset account providers, mortgage companies, retirement account providers and various other financial and asset management institutions and/or accounts, for identifying, processing, storing, and categorizing user financial transactions. Currently, financial management systems typically obtain financial transaction information, such as payee identification, payment amount, date of the transaction, time of transaction, etc., via communication with banks, credit card providers, or other financial institutions, using data entry, links to databases, and electronic data transfer systems such as the Open Financial Exchange (OFX) specification or various systems for transferring financial transaction data.

As noted above, in one embodiment, the financial transaction data includes, but is not limited to, data indicating one or more of: the payee name associated with the financial transactions; data related to the secondary financial transaction categorization parameters; the amount of the financial transactions; and an approximate time of the financial transactions.

In one embodiment, an initial analysis/scan of the financial data is conducted and, as part of the analysis, the process for improving the accuracy of the automatic categorization of financial transactions obtains the payee data associated with the financial transaction.

In addition, as part of the initial analysis/scan of the financial transaction data, the process for improving the accuracy of the automatic categorization of financial transactions identifies data related to the secondary financial transaction categorization parameters such as, but not limited to: data indicating the transaction amount, and how products and/or services of various kinds are typically priced; data indicating the time associated with the transaction, such as evening, daytime, weekend, weekday, or during, or after, business hours; data indicating the time intervals between related transactions, and/or transactions having the same payee; the type of business payee, such as a large resort vs. a small hotel; and data indicating the transaction amount as compared with data indicating the prices of products and/or services offered by the business payee, as obtained from a merchant database accessible by the process for improving the accuracy of the automatic categorization of financial transactions.

In accordance with one embodiment, the process for improving the accuracy of the automatic categorization of financial transactions analyses the financial transaction data using the secondary financial transaction categorization parameters under the direction of one or more processors associated with one or computing systems.

In one embodiment, as a result of this analysis, the process for improving the accuracy of the automatic categorization of financial transactions determines a financial category to automatically apply to the financial transactions associated with the financial transaction data and then uses one or more processors associated with one or more computing systems to transform data indicating the category of the financial transactions to data indicating a financial category indicated by the results of the analysis.

As noted above, in one embodiment, when auto-categorizing downloaded transactions to a financial management system, the process for improving the accuracy of the automatic categorization of financial transactions takes into account not only the payees associated with the financial transactions but also the amounts of the financial transactions and how products and/or services are usually priced.

For instance, as a specific example, if the payee of a given financial transaction is a casino and the transaction amount is an even dollar amount, such as $100, then, in one embodiment, the process for improving the accuracy of the automatic categorization uses a secondary financial transaction categorization generalized pricing parameter to categorize the financial transaction as "entertainment" based on the assumption that an even dollar amount is probably a transaction associated with buying "chips", withdrawing cash, or obtaining credit, to gamble. On the other hand, if the payee of the given transaction is a casino and the transaction amount is an uneven dollar amount, such as $9.95, then, in one embodiment, the process for improving the accuracy of the automatic categorization uses the secondary financial transaction categorization generalized pricing parameter to categorize the financial transaction as "food" based on the assumption that transactions having "cents", and particularly 95 or 99 cents, are often food related.

As noted above, in addition, in one embodiment, the process for improving the accuracy of the automatic categorization has access to the data indicating prices of various items offered by the payee for comparison, such as menu data, from a merchant database associated with, maintained by, or otherwise accessible by, the process for improving the accuracy of the automatic categorization of financial transactions.

As another specific example, if the payee of a given transaction is a casino or a hotel and the transaction amount is a one-time large amount, such as $250.00, then, in one embodiment, the process for improving the accuracy of the automatic categorization of financial transactions uses a secondary financial transaction categorization known services parameter to categorize the financial transaction as "lodging" based on the fact that $250.00 is a likely cost of a room, or that the process for improving the accuracy of the automatic categorization of financial transactions uses a secondary financial transaction categorization known pricing parameter and data that indicates the price of a room at that payee location is $250.00 from a merchant database associated with, maintained by, or otherwise accessible by, the process for improving the accuracy of the automatic categorization of financial transactions.

As noted above, in one embodiment, when auto-categorizing downloaded transactions to a financial management system, the process for improving the accuracy of the automatic categorization of financial transactions takes into account not only the payees associated with the financial transactions but also the number, and frequency, of financial transactions having the same payee, and/or related in time.

As specific example, if the payee of ten financial transactions is a casino, and/or all ten transactions occurred in a time frame of a few hours, and/or all ten transactions occurred after normal business hours or on a weekend, and/or all ten transactions were for the same amount, then, in one embodiment, the process for improving the accuracy of the automatic categorization of financial transactions uses a secondary financial transaction categorization occurrence frequency parameter and assumes these were transactions associated with buying "chips", withdrawing cash, or obtaining credit, to gamble. Consequently, in one embodiment, the process for improving the accuracy of the automatic categorization would categorize all ten financial transactions as "entertainment". On the other hand, if 9 transactions were for the same amount but the remaining one transaction had a different amount, then, in one embodiment, the odd transaction could be categorized as "food" by the process for improving the accuracy of the automatic categorization of financial transactions based on a secondary financial transaction categorization known services parameter and/or because people often order food at casinos in between games.

As noted above, in one embodiment, when auto-categorizing downloaded transactions to a financial management system, the process for improving the accuracy of the automatic categorization of financial transactions takes into account not only the payees associated with the financial transactions but the process for improving the accuracy of the automatic categorization of financial transactions also obtains access to pricing data associated with various businesses and uses the pricing data to help improve the accuracy of the automatic categorization process.

In various embodiments, the pricing data is obtained from a merchant database associated with, maintained by, or otherwise accessible by, the process for improving the accuracy of the automatic categorization of financial transactions. In various embodiments, the pricing data is obtained from one or more websites associated with various payees and/or third parties. In various embodiments, the pricing data is obtained from any source of pricing data, as discussed herein, and/or as known in the art at the time of filing, and/or as developed/made available after the time of filing.

As a specific example, assume the process for improving the accuracy of the automatic categorization of financial transactions obtains data indicating the cost of movie tickets at a given movie theater at various times. Then, in one embodiment, if the payee of two financial transactions is the movie theater, and the amount of one of the financial transactions is the price of a ticket at the movie theater, or any multiple thereof, and the other transaction is not, then, in one embodiment, the process for improving the accuracy of the automatic categorization of financial transactions uses the secondary financial transaction categorization known pricing parameter to categorize the financial transaction that is the price of a ticket at the movie theater, or any multiple thereof, as "entertainment". In this example, in one embodiment, the process for improving the accuracy of the automatic categorization of financial transactions also uses the a secondary financial transaction categorization known services parameter to categorize the second financial transaction that is not the price of a ticket at the movie theater, or any multiple thereof, as "food" based on the knowledge that this is the only other service offered by the theater and/or the assumption that the movies goers purchased popcorn, candy, soda, etc. at the theater after they purchased their tickets.

Hardware System Architecture

FIG. 1 is a block diagram of an exemplary hardware architecture for implementing one embodiment of a system and method for improving the accuracy of the automatic categorization of financial transactions, such as exemplary process 200 (FIG. 2) discussed herein, that, returning to FIG. 1, includes: a user computing system 100, e.g., a first computing system; a provider computing system 120, e.g., a second computing system; a database 170, and a merchant database 176, all operatively coupled by various communications links 140.

As seen in FIG. 1, computing system 100 typically includes a central processing unit (CPU) 101, an input/output (I/O) interface 105, a communications interface 106; and a memory system 103.

As noted above, as used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As also noted above, the term "mobile computing system" and "mobile device" are used interchangeably and include, but are not limited to: a portable computer; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; digital telephones; two-way pagers; PDAs; media players; or any desired combination of these devices and/or computing systems, that are coupled to perform the processes and/or operations as described herein.

In one embodiment, memory system 103 includes all, or part, of a financial management system 180, such as any financial management system discussed herein, known in the art at the time of filing, and/or as developed thereafter.

In one embodiment, memory system 103 includes user financial transaction data 183 representing financial transactions conducted by a user.

In one embodiment, user financial transaction data 183 is obtained from one or more sources.

In one embodiment, user financial transaction data 183 includes, but is not limited to, data indicating one or more of:

the payee name associated with the financial transaction; the amount of the financial transaction; data associated with the secondary financial transaction categorization parameters; and/or an approximate time of the financial transaction.

In one embodiment, access to at least part of user financial transaction data 183 is obtained through, or from, one or more financial institutions, such as, but not limited to, banks, credit card companies, asset account providers, mortgage companies, retirement account providers and various other financial and asset management institutions. In one embodiment, access to user financial transaction data 183 is obtained through, or from, one or more financial institution websites, financial institution databases, and/or any other financial data sources as discussed herein, and/or as known in the art at the time of filing, and/or as developed after the time of filing.

In one embodiment, access to at least part of user financial transaction data 183 is obtained through, or from, one or more financial management systems, such as financial management system 180, that implement, include, are accessible by, and/or are otherwise associated with, process for improving the accuracy of the automatic categorization of financial transactions 200 (labeled process 200 in FIG. 1).

In one embodiment, financial management system 180, and/or user financial transaction data 183, is/are stored, in whole, or in part, in memory system 103, and is/are used by, or include, or is/are accessed by, process for improving the accuracy of the automatic categorization of financial transactions 200.

In one embodiment, at least part of user financial transaction data 183 is sent to provider computing system 120.

In one embodiment, memory system 103 includes all, or part, of secondary financial transaction parameter data 104. In one embodiment, secondary financial transaction parameter data 104 is data representing the defined/determined secondary financial transaction categorization parameters.

In one embodiment, memory system 103 includes all, or part, of transaction categorization data 128 sent to user computing system 100, and memory 103, from automatic categorization engine 124, and memory 123, of provider computing system 120.

Returning to FIG. 1, computing system 100 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, user computing system 100, whether available or known at the time of filing or as later developed.

As discussed in more detail below, in one embodiment, a process for improving the accuracy of the automatic categorization of financial transactions, and/or a financial management system, are entered, in whole, or in part, into computing system 100 via I/O interface 105, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

Computing system 100 can be any computing system as defined herein and/or as known in the art at the time of filing and/or as developed thereafter, that includes components that can execute all, or part, of a process for improving the accuracy of the automatic categorization of financial transactions, and/or a financial management system, in accordance with at least one of the embodiments as described herein.

Also shown in FIG. 1 is database 170. In one embodiment, database 170 is a data storage device, a designated server system or computing system, or a designated portion of one or more server systems or computing systems, such as computing systems 100 and 120, or a distributed database, or an external and/or portable hard drive. In one embodiment, database 170 is a dedicated mass storage device implemented in software, hardware, or a combination of hardware and software. In one embodiment, database 170 includes a web-based function.

In one embodiment, database 170 includes all, or part of, secondary financial transaction parameter data 104. In one embodiment, secondary financial transaction parameter data 104 is data representing the defined/determined secondary financial transaction categorization parameters.

Also shown in FIG. 1 is merchant database 176. In one embodiment, merchant database 176 is a data storage device, a designated server system or computing system, or a designated portion of one or more server systems or computing systems, such as computing systems 100 and 120, or a distributed database, or an external and/or portable hard drive. In one embodiment, merchant database 176 is a dedicated mass storage device implemented in software, hardware, or a combination of hardware and software. In one embodiment, merchant database 176 includes a web-based function.

As noted above, in one embodiment, merchant database 176 and database 170 are the same database. In some embodiments, merchant database 176 and database 170 are different databases and merchant data 178 indicating the products and/or services provided by merchant payees, and/or the prices of products and/or services provided by the merchant payees is obtained from a separate merchant database 176 such as, but not limited to, a website associated with the merchant, a merchant listing, a review website, or any other source of data indicating the products and/or services provided by the merchant payee as discussed herein, and/or as known in the art at the time of filing, and/or as developed after the time of filing.

As discussed below, in one embodiment, merchant data 178 indicating the products and/or services, and/or the prices of the products and/or services, provided by the merchant payees is analyzed by one or more processors, such as CPU(s) 101 and/or 121, to determine a likely financial categorization for user financial transaction data 183.

As also seen in FIG. 1, provider computing system 120 typically includes a central processing unit (CPUs) 121, communications interface 122, and a memory system 123.

In one embodiment, memory 123 includes at least part of process 200. In one embodiment, memory 123, and/or process 200, includes: at least part of financial transaction data 183 from financial management system 180 and/or user computing system 100, including data indicating a payee associated with the financial transactions of financial transaction data 183, a time associated with the financial transactions of financial transaction data 183, and/or data associated with the secondary financial transaction categorization parameters; at least part of the secondary financial transaction categorization parameter data 104 from user computing system 100 and/or database 170; and at least part of merchant data 178 from merchant database 176.

In one embodiment, at least part of financial transaction data 183 from financial management system 180 and/or user computing system 100, including data indicating a payee associated with the financial transactions of financial transaction data 183, a time associated with the financial transactions of financial transaction data 183, and/or data associated with the secondary financial transaction categorization parameters; at least part of the secondary financial transaction categorization parameter data 104 from user computing system 100 and/or database 170; and at least part of merchant data 178 from merchant database 176 are provided to automatic categorization engine 124.

In one embodiment, automatic categorization engine 124 uses at least part of financial transaction data 183 from financial management system 180 and/or user computing system 100, including data indicating a payee associated with the financial transactions of financial transaction data 183, a time associated with the financial transactions of financial transaction data 183, and/or data associated with the secondary financial transaction categorization parameters; at least part of the secondary financial transaction categorization parameter data 104 from user computing system 100 and/or database 170; and at least part of merchant data 178 from merchant database 176 to automatically assign transaction categorization data 128 to the financial transactions of financial transaction data 183 and to automatically transform the category status of the financial transactions of financial transaction data 183.

In one embodiment, transaction categorization data 128 is sent to user computing system 100 and applied to the financial transaction of financial transaction data 183.

Computing system 120 can be any computing system as defined herein and/or as known in the art at the time of filing and/or as developed thereafter, that includes components that can execute all, or part, of process for improving the accuracy of the automatic categorization of financial transactions 200 in accordance with at least one of the embodiments as described herein.

Provider computing system 120 may further include standard user interface devices such as a keyboard (not shown), a mouse (not shown), a printer (not shown), and a display device (not shown), as well as, one or more standard input/output (I/O) devices (not shown), such as a compact disk (CD) or Digital Video Disc (DVD) drive, floppy disk drive, or other digital or waveform port, or other device capable of inputting data to, and outputting data from, provider computing system 120, whether available or known at the time of filing or as later developed.

In one embodiment, computing systems 100 and 120, and databases 170 and 176, are linked together via communications channels 140. In various embodiments, any, or all, of communications channels 140 can be, but are not limited to: a mobile communication link, such as a mobile phone link; a land-line phone link; a cable-based communications link; a satellite communications link; the Internet, a cloud, or other network communications link; and/or any other communications link, or combination of communications links, as discussed herein, and/or as known in the art at the time of filing, and/or as developed after the time of filing.

As used herein, the term "network" includes, but is not limited to, any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

In one embodiment, computing systems 100 and 120, and databases 170 and 176 are part of a cloud computing environment.

Those of skill in the art will readily recognize that the components shown in FIG. 1, and their respective sub-components are shown for illustrative purposes only and that architectures with more or fewer components can implement, and benefit from, the invention. Moreover, one or more components may be located remotely from their respective system and accessed via network, as discussed herein. In addition, the particular type of, and configuration of, computing systems 100 and 120, and databases 170 and 176 are not relevant.

Those of skill in the art will readily recognize that the components shown in FIG. 1, and their respective sub-components, are shown for illustrative purposes only and that architectures with more or fewer components can implement, and benefit from, one or more embodiments. Moreover, one or more components of user computing systems 100 and 120, and databases 170 and 176 may be located remotely from their respective system and accessed via communication channels 140. In addition, the particular type of, and configuration of, computing systems 100 and 120, and databases 170 and 176 are not relevant.

As discussed in more detail below, in one embodiment, a process for improving the accuracy of the automatic categorization of financial transactions, and/or a financial management system, and/or data associated with one or more users, is stored, in whole, or in part, in one or more memory systems, and/or cache memories, associated with one or more computing systems. As used herein, a memory refers to a volatile memory, a non-volatile memory, or any combination of the two.

Although a process for improving the accuracy of the automatic categorization of financial transactions, and/or a financial management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for improving the accuracy of the automatic categorization of financial transactions, and/or a financial management system, are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 121. In one embodiment, execution of a process by CPU 101 or 121 results in the operations of an agent computer process (not shown) and/or a rule computer process (not shown).

In one embodiment, a process for improving the accuracy of the automatic categorization of financial transactions, and/or a financial management system, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, or other media or process capable of delivering computer readable data representing computer readable code, whether available or known at the time of filing or as later developed. This medium may belong to a computing system or the medium may be removable and/or remote from the computing system.

Process

Herein, the term "user" and "user consumer" are used interchangeably to denote any party and/or entity that interfaces with, and/or to whom information is provided by, a process for improving the accuracy of the automatic categorization of financial transactions, and/or a person and/or entity that interfaces with, and/or to whom information is provided by, a process for improving the accuracy of the automatic categorization of financial transactions, and/or a legal guardian of person and/or entity that interfaces with, and/or to whom information is provided by, a process for improving the accuracy of the automatic categorization of financial transactions, and/or an authorized agent of any party and/or person and/or entity that interfaces with, and/or to whom information is provided by, a process for improving the accuracy of the automatic categorization of financial transactions.

In accordance with one embodiment, a system and method for improving the accuracy of the automatic categorization of financial transactions includes a process for improving the accuracy of the automatic categorization of financial transactions whereby a flexible and comprehensive approach to the automatic categorization of financial transactions is employed.

In accordance with one embodiment, the process for improving the accuracy of the automatic categorization of financial transactions obtains financial transaction data associated with one or more financial transactions conducted by a user from one or more sources. In one embodiment, the financial transaction data includes data indicating, but not limited to, one or more of the following: the amount of the transaction; the payee of the transaction; the date of the transaction; the time of the transaction; the location of the transaction; and/or any other data associated with the transaction desirable and obtainable.

In accordance with one embodiment, the process for improving the accuracy of the automatic categorization of financial transactions then analyses the financial transaction data. As part of the analysis, the process for improving the accuracy of the automatic categorization of financial transactions uses not only the payee data associated with the financial transaction but also one or more secondary categorization parameters such as, but not limited to: data indicating the transaction amount, and data indicating how products and/or services of various kinds are typically priced; data indicating the time associated with the transaction, such as evening, daytime, weekend, weekday, or during, or after, business hours; data indicating the time intervals between related transactions, and/or transactions having the same payee; data indicating the type of business payee, such as a large resort vs. a small hotel; and data indicating the transaction amount as compared with data indicating the prices of products and/or services offered by the business payee, as obtained from a merchant database accessible by the process for improving the accuracy of the automatic categorization of financial transactions.

In one embodiment, as a result of this more comprehensive analysis using the secondary categorization parameters, the process for improving the accuracy of the automatic categorization of financial transactions determines a financial category to apply to the financial transactions and then transforms data indicating the category of the financial transactions into data indicating a financial category indicated by the results of the analysis.

Figure 2:
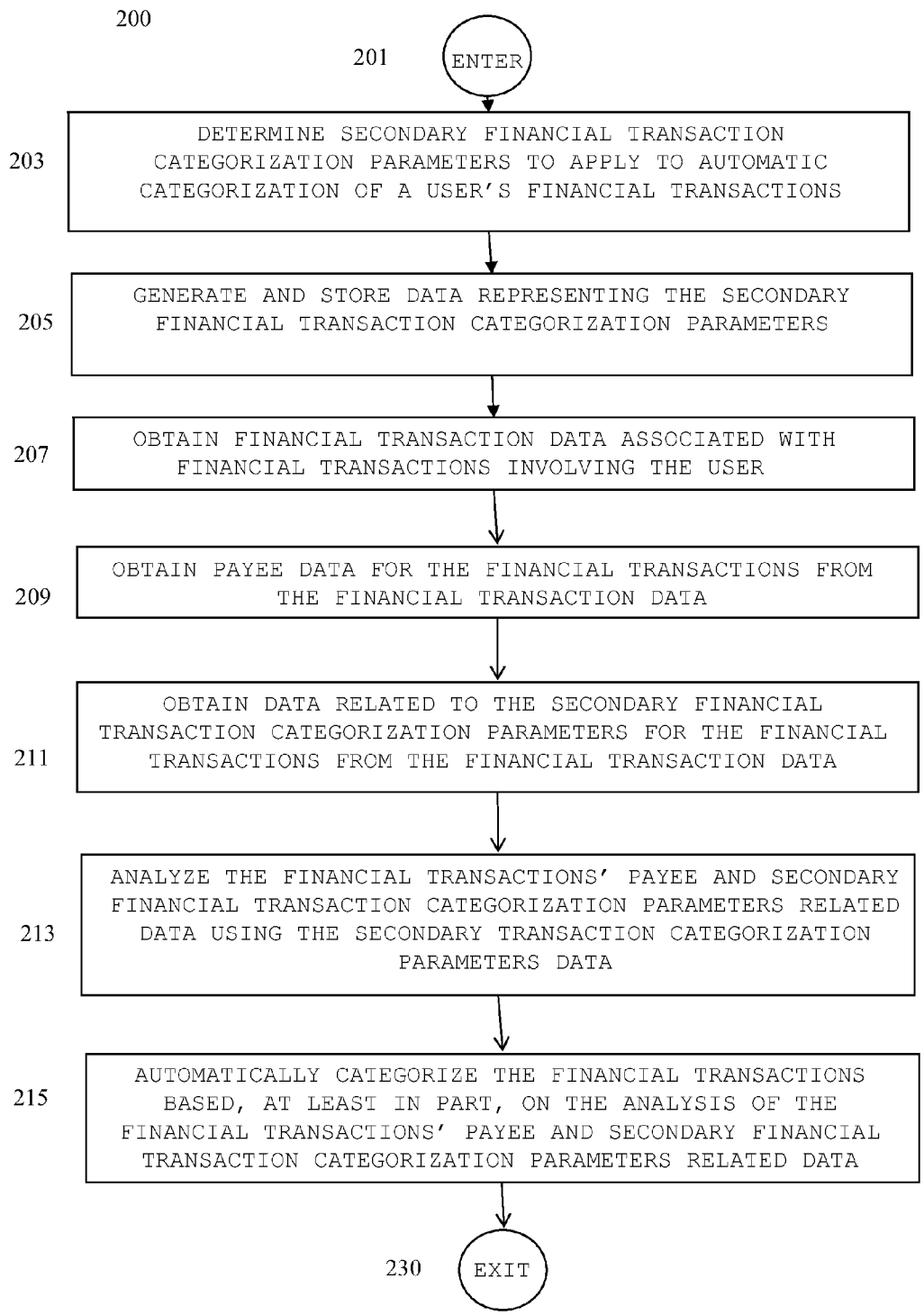
FIG. 2 is a flow chart depicting a process for improving the accuracy of the automatic categorization of financial transactions in accordance with one embodiment.

FIG. 2 is a flow chart depicting a process for improving the accuracy of the automatic categorization of financial transactions 200 in accordance with one embodiment. Process for improving the accuracy of the automatic categorization of financial transactions 200 begins at ENTER OPERATION 201 of FIG. 2 and process flow proceeds to DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203.

In one embodiment, at DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203 secondary financial transaction categorization parameters are defined/determined that are to be used in conjunction with the payee data associated with a financial transaction to automatically categorize a financial transaction.

In accordance with one embodiment, at DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203 the secondary financial transaction categorization parameters are defined/determined by the provider of process for improving the accuracy of the automatic categorization of financial transactions 200.

In accordance with one embodiment, at DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203 a list of secondary financial transaction categorization parameters are defined/determined by the provider of process for improving the accuracy of the automatic categorization of financial transactions 200 and the list of secondary financial transaction categorization parameters is shown to the user. One or more of the secondary financial transaction categorization parameters are then selected by the user.

In accordance with one embodiment, at DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203 secondary financial transaction categorization parameters are defined/determined by the user of process for improving the accuracy of the automatic categorization of financial transactions.

In various embodiments, the secondary financial transaction categorization parameters of at DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203 include, but are not limited to, a secondary financial transaction categorization generalized pricing parameter that determines automatic categorization of a financial transaction based, at least in part, on the amount of the financial transaction and how products and/or services of various kinds in various categories are typically priced.

For instance, in one embodiment, the secondary financial transaction categorization generalized pricing parameter dictates that transactions having a resort/casino/hotel as a payee and having "cents" are categorized as a food expense because food prices normally have cents such as $8.95, $9.95, etc. as opposed to $9.00 or $10.00.

In various embodiments, the secondary financial transaction categorization parameters of at DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203 include, but are not limited to, a secondary financial transaction categorization occurrence frequency parameter that determines automatic categorization of a financial transaction based, at least in part, on the number of transactions having the same payee in a defined timeframe and/or the amounts of the transactions.

For instance, in one embodiment, if ten transactions are found with the same resort/casino/hotel payee in the same evening for approximately the same amount, then these ten financial transactions are categorized as entertainment transactions based on the assumption that the ten transactions for the same amount represent a user taking part in the same entertainment event multiple times, such as buying gambling chips at a casino or playing a game in an arcade that is part of a resort/hotel/casino, or even buying multiple cocktails at the resort/hotel/casino bar.

As another specific example, if ten transactions are found with the same resort/casino/hotel payee in the same evening and if nine of the ten transactions have same amount, but the remaining one transaction has a different amount then, in one embodiment, the secondary financial transaction categorization occurrence frequency parameter determines that the nine transactions are to be automatically categorized as entertainment, based on the assumption above, and that the tenth transaction be automatically categorized as food, of some other service related category.

In various embodiments, the secondary financial transaction categorization parameters of at DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203 include, but are not limited to, a secondary financial transaction categorization known pricing parameter that determines automatic categorization of a financial transaction based, at least in part, on known pricing/pricing associated with a given payee. In these embodiments, a merchant database is created that includes, but is not limited to, a listing of items/services provided by various merchants/payees and/or the prices the merchants/payees charge for their items/services.

For instance, in one example, in one embodiment, a merchant database is created that includes a local theater and the price charged by the local theater for various types of tickets. Then, in this example, if a financial transaction includes the local theater as the payee, the amount of the financial transaction is obtained and compared with the secondary financial transaction categorization known pricing parameter data, i.e., the known ticket pricing data for the theater. In one embodiment, in this illustrative example, if the amount associated with the financial transaction is equal to the amount of a ticket, a combination of ticket amounts, or the multiple of a ticket amount or combination of ticket amounts, the financial transaction is automatically categorized as "Entertainment". If the amount of the financial transaction is not equal to the amount of a ticket, a combination of ticket amounts, or the multiple of a ticket amount or combination of ticket amounts, the financial transaction is automatically categorized as "food"; food being the only other items offered by the theater.

In various embodiments, the secondary financial transaction categorization parameters of at DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203 include, but are not limited to, a secondary financial transaction categorization known services parameter that determines the automatic categorization of a financial transaction based, at least in part, on known services associated with a given payee. In these embodiments, a merchant database is again created that includes, but is not limited to, a listing of items/services provided by various merchants/payees.

In one illustrative example, if several financial transactions have a payee that is a hotel/resort/casino, and one transaction is for a relatively large amount such as $250.00 and the others are for relatively smaller amounts, then, in this specific example, the merchant database would be searched for services offered by the payee hotel/resort/casino. In this example, if the merchant database indicates the payee hotel/resort/casino offers only rooms and a restaurant, then the $250.00 is automatically categorized as "lodging" and the other transactions are automatically categorized as "food".

In various embodiments, other secondary financial transaction categorization parameters are defined/determined at DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203 and any combination of two or more of the above secondary financial transaction categorization parameters, and/or other secondary financial transaction categorization parameters, are used to determine the automatic categorization to be applied to a financial transaction as discussed below.

In one embodiment, once secondary financial transaction categorization parameters are defined/determined that are to be used in conjunction with the payee data associated with a financial transaction to automatically categorize a financial transaction at DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203, process flow proceeds to GENERATE AND STORE DATA REPRESENTING THE SECONDARY FINANCIAL TRANSACTION CATEGORIZATION PARAMETERS OPERATION 205.

In one embodiment, at GENERATE AND STORE DATA REPRESENTING THE SECONDARY FINANCIAL TRANSACTION CATEGORIZATION PARAMETERS OPERATION 205 data representing the defined/determined secondary financial transaction categorization parameters of DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203 is generated and stored in whole, or in part, in one or more memory systems, and/or cache memories, and/or any database, associated with one or more computing systems.

In one embodiment, at GENERATE AND STORE DATA REPRESENTING THE SECONDARY FINANCIAL TRANSACTION CATEGORIZATION PARAMETERS OPERATION 205 data representing the defined/determined secondary financial transaction categorization parameters of DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203 is generated by one or more processors, such as CPU 101 and/or CPU 121 of FIG. 1.

Returning to FIG. 2, in one embodiment, at GENERATE AND STORE DATA REPRESENTING THE SECONDARY FINANCIAL TRANSACTION CATEGORIZATION PARAMETERS OPERATION 205 data representing the defined/determined secondary financial transaction categorization parameters of DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203 is generated and stored in whole, or in part, in one or more memory systems, such as memories 103 and/or 123 of FIG. 1, and/or cache memories, and/or any database, such as databases 170 and/or 176 of FIG. 1, associated with one or more computing systems, such as computing systems 100 and/or 120 of FIG. 1.

Returning to FIG. 2, as used herein, a memory refers to a volatile memory, a non-volatile memory, or any combination of the two.

As used herein, the term "database" includes, but is not limited to, any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to any data storage means that is part of, or under the control of, any computing system, as discussed herein, known at the time of filing, or as developed thereafter.

In one embodiment, once data representing the defined/determined secondary financial transaction categorization parameters of DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203 is generated and stored in whole, or in part, in one or more memory systems, and/or any database, associated with one or more computing systems at GENERATE AND STORE DATA REPRESENTING THE SECONDARY FINANCIAL TRANSACTION CATEGORIZATION PARAMETERS OPERATION 205, process flow proceeds to OBTAIN FINANCIAL TRANSACTION DATA ASSOCIATED WITH FINANCIAL TRANSACTIONS INVOLVING THE USER OPERATION 207.

In one embodiment, at OBTAIN FINANCIAL TRANSACTION DATA ASSOCIATED WITH FINANCIAL TRANSACTIONS INVOLVING THE USER OPERATION 207 financial transaction data associated with one or more financial transactions conducted by a user is obtained from one or more sources.

In one embodiment, the financial transaction data of OBTAIN FINANCIAL TRANSACTION DATA ASSOCIATED WITH FINANCIAL TRANSACTIONS INVOLVING THE USER OPERATION 207 includes data indicating, but not limited to, one or more of the following: the payee of the transaction; data related to the secondary financial transaction categorization parameters; the amount of the transaction; the date of the transaction; the time of the transaction; the location of the transaction; and/or any other data associated with the transaction desirable and obtainable.

In one embodiment, at OBTAIN FINANCIAL TRANSACTION DATA ASSOCIATED WITH FINANCIAL TRANSACTIONS INVOLVING THE USER OPERATION 207 the financial transaction data is obtained from a user computing system, such as user computing system 100 of FIG. 1.

As used herein, the term "computing system", includes, but is not limited to: a desktop computing system; a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

Returning to FIG. 2, in one embodiment, at OBTAIN FINANCIAL TRANSACTION DATA ASSOCIATED WITH FINANCIAL TRANSACTIONS INVOLVING THE USER OPERATION 207 the financial transaction data is obtained from a user mobile device. Herein, the term "mobile computing system" and "mobile device" are used interchangeably and include, but are not limited to: a portable computer; a two-way pager; a cellular telephone; a smart phone; a digital wireless telephone; a Personal Digital Assistant (PDA); a media player, i.e., an MP3 player and/or other music and/or video player; an Internet appliance; or any other mobile device and/or computing system that includes components that can execute all, or part, of any one of the processes and/or operations as described herein. In addition, as used herein, the term mobile computing system and/or mobile device, can denote, but is not limited to, computing systems made up of multiple: wireless devices; cellular telephones; smart phones; digital telephones; two-way pagers; PDAs; media players; or any desired combination of these devices and/or computing systems, that are coupled to perform the processes and/or operations as described herein.

In one embodiment, one or more mobile computing systems are connected by one or more mobile communication networks such as, but not limited to: any general network, communications network, or general network/communications network system; a cellular network; a wireless network; a combination of different network types, or other wireless, wired, and/or a wireless and wired combination network; a public network; a private network; a satellite network; a cable network; or any other network capable of allowing communication between two or more computing systems, as discussed herein, and/or available or known at the time of filing, and/or as developed after the time of filing.

In one embodiment, access to at least part of the financial transaction data is obtained at OBTAIN FINANCIAL TRANSACTION DATA ASSOCIATED WITH FINANCIAL TRANSACTIONS INVOLVING THE USER OPERATION 207 through, or from, one or more financial institutions, such as, but not limited to, banks, credit card companies, asset account providers, mortgage companies, retirement account providers and various other financial and asset management institutions. In one embodiment, access to at least part of the financial transaction data is obtained through, or from, one or more financial institution websites, financial institution databases, and/or any other financial data sources as discussed herein, and/or as known in the art at the time of filing, and/or as developed after the time of filing.

In one embodiment, access to at least part of the financial transaction data is obtained at OBTAIN FINANCIAL TRANSACTION DATA ASSOCIATED WITH FINANCIAL TRANSACTIONS INVOLVING THE USER OPERATION 207 through, or from, one or more financial management systems, such as financial management system 180 of FIG. 1, that implement, include, are accessible by, and/or are otherwise associated with, process for improving the accuracy of the automatic categorization of financial transactions 200.

Herein, a financial management system can be, but is not limited to, any data management system implemented on a computing system and/or accessed through a network that gathers financial data, including financial transactional data, from one or more sources and/or has the capability to analyze and categorize at least part of the financial data.

As used herein, the term financial management system includes, but is not limited to: computing system implemented, and/or online, personal and/or business financial management systems, packages, programs, modules, or applications; computing system implemented, and/or online, personal and/or business tax preparation systems, packages, programs, modules, or applications; computing system implemented, and/or online, personal and/or business accounting and/or invoicing systems, packages, programs, modules, or applications; and various other personal and/or business electronic data management systems, packages, programs, modules, or applications, whether known at the time of filling or as developed later.

Specific examples of financial management systems include, but are not limited to: Quicken™, available from Intuit, Inc. of Mountain View, Calif.; Quicken On-Line™, available from Intuit, Inc. of Mountain View, Calif.; QuickBook™, available from Intuit, Inc. of Mountain View, Calif.; QuickBooks On-Line™, available from Intuit, Inc. of Mountain View, Calif.; Mint™, available from Intuit, Inc. of Mountain View, Calif.; Quicken Health Expense Manager™, available from Intuit, Inc. of Mountain View, Calif.; Microsoft Money™, previously available from Microsoft, Inc. of Redmond, Wash.; and/or various other financial management systems discussed herein, and/or known to those of skill in the art at the time of filing, and/or as developed after the time of filing.

Current financial management systems are typically software applications which, along with a parent computing system or device, help individuals/users manage their finances by providing a centralized interface with banks, credit card companies, asset account providers, mortgage companies, retirement account providers and various other financial and asset management institutions and/or accounts, for identifying, processing, storing, and categorizing user financial transactions. Currently, financial management systems typically obtain financial transaction information, such as payee identification, payment amount, date of the transaction, time of transaction, etc., via communication with banks, credit card providers, or other financial institutions, using data entry, links to databases, and electronic data transfer systems such as the Open Financial Exchange (OFX) specification or various systems for transferring financial transaction data.

Returning to FIG. 2, in one embodiment, once financial transaction data associated with one or more financial transactions conducted by a user is obtained from one or more sources at OBTAIN FINANCIAL TRANSACTION DATA ASSOCIATED WITH FINANCIAL TRANSACTIONS INVOLVING THE USER OPERATION 207, process flow proceeds to OBTAIN PAYEE DATA FOR THE FINANCIAL TRANSACTIONS FROM THE FINANCIAL TRANSACTION DATA OPERATION 209.

In one embodiment, at OBTAIN PAYEE DATA FOR THE FINANCIAL TRANSACTIONS FROM THE FINANCIAL TRANSACTION DATA OPERATION 209 an initial analysis/scan of the financial transaction data of OBTAIN FINANCIAL TRANSACTION DATA ASSOCIATED WITH FINANCIAL TRANSACTIONS INVOLVING THE USER OPERATION 207 is conducted and, as part of the analysis, process for improving the accuracy of the automatic categorization of financial transactions 200 obtains the payee data associated with the financial transactions.

In one embodiment, at OBTAIN PAYEE DATA FOR THE FINANCIAL TRANSACTIONS FROM THE FINANCIAL TRANSACTION DATA OPERATION 209 an initial analysis/scan of the financial transaction data of OBTAIN FINANCIAL TRANSACTION DATA ASSOCIATED WITH FINANCIAL TRANSACTIONS INVOLVING THE USER OPERATION 207 is conducted using one or more processors associated with one or more computing systems, such as CPU(s) 101 and/or 121 of FIG. 1.

Returning to FIG. 2, in one embodiment, once at OBTAIN PAYEE DATA FOR THE FINANCIAL TRANSACTIONS FROM THE FINANCIAL TRANSACTION DATA OPERATION 209 an initial analysis/scan of the financial transaction data of OBTAIN FINANCIAL TRANSACTION DATA ASSOCIATED WITH FINANCIAL TRANSACTIONS INVOLVING THE USER OPERATION 207 is conducted and, as part of the analysis, process for improving the accuracy of the automatic categorization of financial transactions 200 obtains the payee data associated with the financial transactions, process flow proceeds to OBTAIN DATA RELATED TO THE SECONDARY FINANCIAL TRANSACTION CATEGORIZATION PARAMETERS FOR THE FINANCIAL TRANSACTIONS FROM THE FINANCIAL TRANSACTION DATA OPERATION 211.

In one embodiment, at OBTAIN DATA RELATED TO THE SECONDARY FINANCIAL TRANSACTION CATEGORIZATION PARAMETERS FOR THE FINANCIAL TRANSACTIONS FROM THE FINANCIAL TRANSACTION DATA OPERATION 211, an initial analysis/scan of the financial transaction data of OBTAIN FINANCIAL TRANSACTION DATA ASSOCIATED WITH FINANCIAL TRANSACTIONS INVOLVING THE USER OPERATION 207 is conducted and, as part of the analysis, process for improving the accuracy of the automatic categorization of financial transactions 200 obtains data related to the secondary financial transaction categorization parameters of DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203.

In one embodiment, at OBTAIN DATA RELATED TO THE SECONDARY FINANCIAL TRANSACTION CATEGORIZATION PARAMETERS FOR THE FINANCIAL TRANSACTIONS FROM THE FINANCIAL TRANSACTION DATA OPERATION 211 an initial analysis/scan of the financial transaction data of OBTAIN FINANCIAL TRANSACTION DATA ASSOCIATED WITH FINANCIAL TRANSACTIONS INVOLVING THE USER OPERATION 207 is conducted using one or more processors associated with one or more computing systems, such as CPU(s) 101 and/or 121 of FIG. 1.

Returning to FIG. 2, in one embodiment, the data related to the secondary financial transaction categorization parameters of OBTAIN DATA RELATED TO THE SECONDARY FINANCIAL TRANSACTION CATEGORIZATION PARAMETERS FOR THE FINANCIAL TRANSACTIONS FROM THE FINANCIAL TRANSACTION DATA OPERATION 211 includes data such as, but not limited to: data indicating the transaction amount, and how products and/or services of various kinds are typically priced; data indicating the time associated with the transaction, such as evening, daytime, weekend, weekday, or during, or after, business hours; data indicating the time intervals between related transactions, and/or transactions having the same payee; the type of business payee, such as a large resort vs. a small hotel;

and data indicating the transaction amount as compared with data indicating the prices of products and/or services offered by the business payee, as obtained from a merchant database accessible by the process for improving the accuracy of the automatic categorization of financial transactions.

In one embodiment, once an initial analysis/scan of the financial transaction data of OBTAIN FINANCIAL TRANSACTION DATA ASSOCIATED WITH FINANCIAL TRANSACTIONS INVOLVING THE USER OPERATION 207 is conducted and, as part of the analysis, process for improving the accuracy of the automatic categorization of financial transactions 200 obtains data related to the secondary financial transaction categorization parameters of DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203 at OBTAIN DATA RELATED TO THE SECONDARY FINANCIAL TRANSACTION CATEGORIZATION PARAMETERS FOR THE FINANCIAL TRANSACTIONS FROM THE FINANCIAL TRANSACTION DATA OPERATION 211, process flow proceeds to process flow proceeds to ANALYZE THE FINANCIAL TRANSACTIONS' PAYEE AND SECONDARY FINANCIAL TRANSACTION CATEGORIZATION PARAMETERS RELATED DATA USING THE SECONDARY TRANSACTION CATEGORIZATION PARAMETERS DATA OPERATION 213.

In one embodiment, at ANALYZE THE FINANCIAL TRANSACTIONS' PAYEE AND SECONDARY FINANCIAL TRANSACTION CATEGORIZATION PARAMETERS RELATED DATA USING THE SECONDARY TRANSACTION CATEGORIZATION PARAMETERS DATA OPERATION 213 process for improving the accuracy of the automatic categorization of financial transactions 200 analyses the financial transaction data of OBTAIN FINANCIAL TRANSACTION DATA ASSOCIATED WITH FINANCIAL TRANSACTIONS INVOLVING THE USER OPERATION 207 using the secondary financial transaction categorization parameters of DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203.

In one embodiment, at ANALYZE THE FINANCIAL TRANSACTIONS' PAYEE AND SECONDARY FINANCIAL TRANSACTION CATEGORIZATION PARAMETERS RELATED DATA USING THE SECONDARY TRANSACTION CATEGORIZATION PARAMETERS DATA OPERATION 213 process for improving the accuracy of the automatic categorization of financial transactions 200 analyses the financial transaction data of OBTAIN FINANCIAL TRANSACTION DATA ASSOCIATED WITH FINANCIAL TRANSACTIONS INVOLVING THE USER OPERATION 207 using the secondary financial transaction categorization parameters of DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203 under the direction of one or more processors associated with one or computing systems, such as CPU 101 and/or CPU 121 of FIG. 1.

In one embodiment, once process for improving the accuracy of the automatic categorization of financial transactions 200 analyses the financial transaction data of OBTAIN FINANCIAL TRANSACTION DATA ASSOCIATED WITH FINANCIAL TRANSACTIONS INVOLVING THE USER OPERATION 207 using the secondary financial transaction categorization parameters of DETERMINE SECONDARY FINANCIAL TRANSACTION CATEGORIZATION PARAMETERS TO APPLY TO AUTOMATIC CATEGORIZATION OF A USER'S FINANCIAL TRANSACTIONS OPERATION 203 at ANALYZE THE FINANCIAL TRANSACTIONS' PAYEE AND SECONDARY FINANCIAL TRANSACTION CATEGORIZATION PARAMETERS RELATED DATA USING THE SECONDARY TRANSACTION CATEGORIZATION PARAMETERS DATA OPERATION 213, process flow proceeds to AUTOMATICALLY CATEGORIZE THE FINANCIAL TRANSACTIONS BASED, AT LEAST IN PART, ON THE ANALYSIS OF THE FINANCIAL TRANSACTIONS' PAYEE AND SECONDARY FINANCIAL TRANSACTION CATEGORIZATION PARAMETERS RELATED DATA OPERATION 215.

In one embodiment, at AUTOMATICALLY CATEGORIZE THE FINANCIAL TRANSACTIONS BASED, AT LEAST IN PART, ON THE ANALYSIS OF THE FINANCIAL TRANSACTIONS' PAYEE AND SECONDARY FINANCIAL TRANSACTION CATEGORIZATION PARAMETERS RELATED DATA OPERATION 215, as a result of the analysis of ANALYZE THE FINANCIAL TRANSACTIONS' PAYEE AND SECONDARY FINANCIAL TRANSACTION CATEGORIZATION PARAMETERS RELATED DATA USING THE SECONDARY TRANSACTION CATEGORIZATION PARAMETERS DATA OPERATION 213, process for improving the accuracy of the automatic categorization of financial transactions 200 determines a financial category to automatically apply to the financial transactions associated with the financial transaction data.

In one embodiment, at AUTOMATICALLY CATEGORIZE THE FINANCIAL TRANSACTIONS BASED, AT LEAST IN PART, ON THE ANALYSIS OF THE FINANCIAL TRANSACTIONS' PAYEE AND SECONDARY FINANCIAL TRANSACTION CATEGORIZATION PARAMETERS RELATED DATA OPERATION 215, as a result of the analysis of ANALYZE THE FINANCIAL TRANSACTIONS' PAYEE AND SECONDARY FINANCIAL TRANSACTION CATEGORIZATION PARAMETERS RELATED DATA USING THE SECONDARY TRANSACTION CATEGORIZATION PARAMETERS DATA OPERATION 213, process for improving the accuracy of the automatic categorization of financial transactions 200 uses one or more processors, such as CPU 101 and/or CPU 121 of FIG. 1, associated with one or more computing systems, such as user computing system 100 and/or provider computing system 120 of FIG. 1, to transform data indicating the category of the financial transactions to data indicating a financial category indicated by the results of the analysis of ANALYZE THE FINANCIAL TRANSACTIONS' PAYEE AND SECONDARY FINANCIAL TRANSACTION CATEGORIZATION PARAMETERS RELATED DATA USING THE SECONDARY TRANSACTION CATEGORIZATION PARAMETERS DATA OPERATION 213.

As noted above, in one embodiment, when auto-categorizing downloaded transactions to a financial management system, process for improving the accuracy of the automatic categorization of financial transactions 200 takes into account not only the payees associated with the financial transactions but also the amounts of the financial transactions and how products and/or services are usually priced.

For instance, as a specific example, if the payee of a given financial transaction is a casino and the transaction amount is an even dollar amount, such as $100, then, in one embodiment, at AUTOMATICALLY CATEGORIZE THE FINAN- CIAL TRANSACTIONS BASED, AT LEAST IN PART, ON THE ANALYSIS OF THE FINANCIAL TRANSACTIONS' PAYEE AND SECONDARY FINANCIAL TRANSACTION CATEGORIZATION PARAMETERS RELATED DATA OPERATION 215, process for improving the accuracy of the automatic categorization of financial transactions 200 uses a secondary financial transaction categorization generalized pricing parameter to categorize the financial transaction as "entertainment" based on the assumption that an even dollar amount is probably a transaction associated with buying "chips", withdrawing cash, or obtaining credit, to gamble.

On the other hand, if the payee of the given transaction is a casino and the transaction amount is an uneven dollar amount, such as $9.95, then, in one embodiment, at AUTOMATICALLY CATEGORIZE THE FINANCIAL TRANSACTIONS BASED, AT LEAST IN PART, ON THE ANALYSIS OF THE FINANCIAL TRANSACTIONS' PAYEE AND SECONDARY FINANCIAL TRANSACTION CATEGORIZATION PARAMETERS RELATED DATA OPERATION 215, process for improving the accuracy of the automatic categorization of financial transactions 200 uses the secondary financial transaction categorization generalized pricing parameter to categorize the financial transaction as "food" based on the assumption that transactions having "cents", and particularly 95 or 99 cents, are often food related.

As noted above, in addition, in one embodiment, process for improving the accuracy of the automatic categorization of financial transactions 200 has access to a merchant database, such as merchant database 176 of FIG. 1, and the data indicating prices of various items offered by the payee for comparison, such as menu data, from a merchant database associated with, maintained by, or otherwise accessible by, process for improving the accuracy of the automatic categorization of financial transactions 200.

As another specific example, if the payee of a given transaction is a casino or a hotel and the transaction amount is a one-time large amount, such as $250.00, then, in one embodiment, at AUTOMATICALLY CATEGORIZE THE FINANCIAL TRANSACTIONS BASED, AT LEAST IN PART, ON THE ANALYSIS OF THE FINANCIAL TRANSACTIONS' PAYEE AND SECONDARY FINANCIAL TRANSACTION CATEGORIZATION PARAMETERS RELATED DATA OPERATION 215, process for improving the accuracy of the automatic categorization of financial transactions 200 uses a secondary financial transaction categorization known services parameter to categorize the financial transaction as "lodging" based on the fact that $250.00 is a likely cost of a room, or that process for improving the accuracy of the automatic categorization of financial transactions 200 uses a secondary financial transaction categorization known pricing parameter and data that indicates the price of a room at that payee location is $250.00 from a merchant database associated with, maintained by, or otherwise accessible by, process for improving the accuracy of the automatic categorization of financial transactions 200.

As noted above, in one embodiment, when auto-categorizing downloaded transactions to a financial management system, process for improving the accuracy of the automatic categorization of financial transactions 200 takes into account not only the payees associated with the financial transactions but also the number, and frequency, of financial transactions having the same payee, and/or related in time.

As specific example, if the payee of ten financial transactions is a casino, and/or all ten transactions occurred in a time frame of a few hours, and/or all ten transactions occurred after normal business hours or on a weekend, and/or all ten transactions were for the same amount, then, in one embodiment, at AUTOMATICALLY CATEGORIZE THE FINANCIAL TRANSACTIONS BASED, AT LEAST IN PART, ON THE ANALYSIS OF THE FINANCIAL TRANSACTIONS' PAYEE AND SECONDARY FINANCIAL TRANSACTION CATEGORIZATION PARAMETERS RELATED DATA OPERATION 215, process for improving the accuracy of the automatic categorization of financial transactions 200 uses a secondary financial transaction categorization occurrence frequency parameter and assumes these were transactions associated with buying "chips", withdrawing cash, or obtaining credit, to gamble. Consequently, in one embodiment, process for improving the accuracy of the automatic categorization of financial transactions 200 would categorize all ten financial transactions as "entertainment".

On the other hand, if 9 transactions were for the same amount but the remaining one transaction had a different amount, then, in one embodiment, the odd transaction could be categorized as "food" by process for improving the accuracy of the automatic categorization of financial transactions 200 based on a secondary financial transaction categorization known services parameter and/or because people often order food at casinos in between games.

As noted above, in one embodiment, when auto-categorizing downloaded transactions to a financial management system, process for improving the accuracy of the automatic categorization of financial transactions 200 takes into account not only the payees associated with the financial transactions but process for improving the accuracy of the automatic categorization of financial transactions 200 also obtains access to pricing data associated with various businesses and uses the pricing data to help improve the accuracy of the automatic categorization process.

In various embodiments, the pricing data is obtained from a merchant database, such as merchant database 176 of FIG. 1, associated with, maintained by, or otherwise accessible by, process for improving the accuracy of the automatic categorization of financial transactions 200. In various embodiments, the pricing data is obtained from one or more websites associated with various payees and/or third parties. In various embodiments, the pricing data is obtained from any source of pricing data, as discussed herein, and/or as known in the art at the time of filing, and/or as developed/made available after the time of filing.

As a specific example, assume process for improving the accuracy of the automatic categorization of financial transactions 200 obtains data indicating the cost of movie tickets at a given movie theater at various times. Then, in one embodiment, if the payee of two financial transactions is the movie theater, and the amount of one of the financial transactions is the price of a ticket at the movie theater, or any multiple thereof, and the other transaction is not, then, in one embodiment, at AUTOMATICALLY CATEGORIZE THE FINANCIAL TRANSACTIONS BASED, AT LEAST IN PART, ON THE ANALYSIS OF THE FINANCIAL TRANSACTIONS' PAYEE AND SECONDARY FINANCIAL TRANSACTION CATEGORIZATION PARAMETERS RELATED DATA OPERATION 215, process for improving the accuracy of the automatic categorization of financial transactions 200 uses the secondary financial transaction categorization known pricing parameter to categorize the financial transaction that is the price of a ticket at the movie theater, or any multiple thereof, as "entertainment". In this example, in one embodiment, at AUTOMATICALLY CATEGORIZE THE FINANCIAL TRANSACTIONS BASED, AT LEAST IN PART, ON THE ANALYSIS OF THE FINANCIAL TRANSACTIONS' PAYEE AND SECONDARY FINANCIAL TRANSACTION CATEGORIZATION PARAMETERS RELATED DATA OPERATION 215, process for improving the accuracy of the automatic categorization of financial transactions 200 also uses the a secondary financial transaction categorization known services parameter to categorize the second financial transaction that is not the price of a ticket at the movie theater, or any multiple thereof, as "food" based on the knowledge that this is the only other service offered by the theater and/or the assumption that the movies goers purchased popcorn, candy, soda, etc. at the theater after they purchased their tickets.

In one embodiment, once, as a result of the analysis of ANALYZE THE FINANCIAL TRANSACTIONS' PAYEE AND SECONDARY FINANCIAL TRANSACTION CATEGORIZATION PARAMETERS RELATED DATA USING THE SECONDARY TRANSACTION CATEGORIZATION PARAMETERS DATA OPERATION 213, process for improving the accuracy of the automatic categorization of financial transactions 200 determines a financial category to automatically apply to the financial transactions associated with the financial transaction data at AUTOMATICALLY CATEGORIZE THE FINANCIAL TRANSACTIONS BASED, AT LEAST IN PART, ON THE ANALYSIS OF THE FINANCIAL TRANSACTIONS' PAYEE AND SECONDARY FINANCIAL TRANSACTION CATEGORIZATION PARAMETERS RELATED DATA OPERATION 215, process flow proceeds to EXIT OPERATION 230. In one embodiment, at EXIT OPERATION 230, process for improving the accuracy of the automatic categorization of financial transactions 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for improving the accuracy of the automatic categorization of financial transactions 200, a more flexible and comprehensive approach to the automatic categorization of financial transactions is employed. As a result, using process for improving the accuracy of the automatic categorization of financial transactions 200, automatic categorizations of financial transactions are more likely to be accurate. Consequently, using process for improving the accuracy of the automatic categorization of financial transactions 200, the numerous issues associated with incorrect automatic categorization of financial transactions, and correction of incorrect categorization of financial transactions, are avoided.

As discussed in more detail above, using the above embodiments, with little or no modification and/or consumer input, there is considerable flexibility, adaptability, and opportunity for customization to meet the specific needs of various consumers under numerous circumstances.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "activating", "accessing", "applying", "analyzing", "associating", "calculating", "capturing", "categorizing", "classifying", "comparing", "creating", "defining", "detecting", "determining", "distributing", "encrypting", "extracting", "filtering", "forwarding", "generating", "identifying", "implementing", "monitoring", "obtaining", "processing", "providing", "receiving", "requesting", "saving", "sending", "storing", "transferring", "transforming", "using", etc., refer to the action and process of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic or algorithmic-like form. It should be noted that the process steps or operations and instructions of the present invention can be embodied in software, firmware, or hardware, and when embodied in software, can be downloaded to reside on and be operated from different platforms used by real time network operating systems.

The present invention also relates to an apparatus or system for performing the operations described herein. This apparatus or system may be specifically constructed for the required purposes, or the apparatus or system can comprise a general purpose system selectively activated or configured/reconfigured by a computer program stored on a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A computing system implemented process for improving accuracy of automatic categorization of financial transactions comprising the following which, when executed individually or collectively by any set of one or more processors, perform a process comprising:
    defining one or more secondary financial transaction categorization parameters to apply to automatic categorization of financial transactions;
    storing the defined one or more secondary financial transaction categorization parameters in a database associated with the party computing system;
    obtaining party financial transaction data associated with a party financial transaction involving a party, the party financial transaction data including data indicating a payee and an amount associated with the party financial transaction;
    identifying merchant payee data indicating products and/or services provided by a merchant payee indicated by the payee data associated with the party financial transaction and merchant pricing information provided by the merchant payee;
    analyzing the payee data, the merchant payee data, and at least part of the party financial transaction data associated with the one or more secondary financial transaction categorization parameters, the secondary financial transaction categorization parameters at least including the time of day when a given transaction occurred and the merchant pricing information provided by the merchant payee;
    determining a first financial category and a second financial category, each of the first and second financial categories being associated with different products available from the payee;
    excluding the first financial category from further consideration as a possible category to be associated with the party financial transaction by determining that the first financial category doesn't include any products and/or services offered by the merchant that are associated with prices that are evenly divisible into the amount of the party financial transaction; and
    determining a financial category to apply to the party financial transaction based, at least in part, on the exclusion of the first financial category from consideration and further based on the analysis of the payee data associated with the party financial transaction, the merchant payee data associated with the payee, and at least part of the party financial transaction data associated with the one or more secondary financial transaction categorization parameters including the time of day when a given transaction occurred and the merchant pricing information provided by the merchant payee, wherein the determined financial category is at least partly determined by correlating one or more items included in the pricing information with an amount of the party financial transaction;
    storing the determined financial category at the party computing system.

2. The computing system implemented process for improving accuracy of automatic categorization of financial transactions of claim 1, wherein
    the merchant data is stored in a merchant database.

3. The computing system implemented process for improving accuracy of automatic categorization of financial transactions of claim 1, wherein
    the one or more secondary financial transaction categorization parameters include a secondary financial transaction categorization generalized pricing parameter to automatically categorize the party financial transaction based, at least in part, on the payee associated with the party financial transaction and the amount of the party financial transaction as compared to how products and/or services of various kinds in various categories are typically priced.

4. The computing system implemented process for improving accuracy of automatic categorization of financial transactions of claim 1, wherein
    the one or more secondary financial transaction categorization parameters include a secondary financial transaction categorization occurrence frequency parameter to automatically categorize the party financial transaction based, at least in part, on the payee associated with the party financial transaction and the number of party financial transactions having the same payee in a defined timeframe and/or the amounts of the party financial transactions.

5. The computing system implemented process for improving accuracy of automatic categorization of financial transactions of claim 1, wherein
    the one or more secondary financial transaction categorization parameters include a secondary financial transaction categorization known services parameter to automatically categorize the party financial transaction based, at least in part, on the payee associated with the party financial transaction and on known services associated the payee associated with the party financial transaction as indicated by the merchant payee data.

6. The computing system implemented process for improving accuracy of automatic categorization of financial transactions of claim 1, wherein
the one or more secondary financial transaction categorization parameters include a secondary financial transaction categorization known pricing parameter to automatically categorize the party financial transaction based, at least in part, on the payee associated with the party financial transaction and on known pricing associated with the payee associated with the party financial transaction as indicated by the merchant payee data.

7. The computing system implemented process for improving accuracy of automatic categorization of financial transactions of claim 1, wherein
one or more of the secondary financial transaction categorization parameters are defined by a provider of the process for improving the accuracy of the automatic categorization of financial transactions.

8. The computing system implemented process for improving accuracy of automatic categorization of financial transactions of claim 1, wherein
one or more of the secondary financial transaction categorization parameters are defined by a party of the process for improving the accuracy of the automatic categorization of financial transactions.

9. The computing system implemented process for improving accuracy of automatic categorization of financial transactions of claim 1, wherein
the party financial transaction data is obtained from a financial institution.

10. The computing system implemented process for improving accuracy of automatic categorization of financial transactions of claim 1, wherein
the party financial transaction data is obtained from a financial management system.

11. A system for improving accuracy of automatic categorization of financial transactions comprising:
a party computing system;
a provider computing system;
a merchant database, the merchant database including data indicating the products and/or services provided by one or more merchants and/or pricing of the products and/or services provided by one or more merchants; and
one or more computing processors associated with one or more computing systems, the one or more computing processors associated with one or more computing systems implementing at least part of a process for improving accuracy of automatic categorization of financial transactions, the process comprising:
defining, at the party computing system, one or more secondary financial transaction categorization parameters to apply to the automatic categorization of financial transactions;
storing the defined one or more secondary financial transaction categorization parameters in a database associated with the party computing system;
obtaining party financial transaction data associated with a party financial transaction involving a party, the party financial transaction data including data indicating a payee and an amount associated with the party financial transaction;
searching merchant data and identifying merchant payee data indicating the products and/or services provided by the merchant payee indicated by the payee data associated with the party financial transaction and merchant pricing information provided by the merchant payee;
analyzing the payee data, the merchant payee data, and at least part of the party financial transaction data associated with the one or more secondary financial transaction categorization parameters, the secondary financial transaction categorization parameters at least including the time of day when a given transaction occurred and the merchant pricing information provided by the merchant payee;
determining a first financial category and a second financial category, each of the first and second financial categories being associated with different products available from the payee;
excluding the first financial category from further consideration as a possible category to be associated with the party financial transaction by determining that the first financial category doesn't include any products and/or services offered by the merchant that are associated with prices that are evenly divisible into the amount of the party financial transaction; and
determining a financial category to apply to the party financial transaction based, at least in part, on the exclusion of the first financial category from consideration and further based on the analysis of the payee data associated with the party financial transaction, the merchant payee data associated with the payee, and at least part of the party financial transaction data associated with the one or more secondary financial transaction categorization parameters including the time of day when a given transaction occurred and the merchant pricing information provided by the merchant payee, wherein the determined financial category is at least partly determined by correlating one or more items included in the pricing information with an amount of the party financial transaction;
storing the determined financial category at the party computing system.

12. The system for improving accuracy of automatic categorization of financial transactions of claim 11, wherein
the merchant data is stored in a merchant database.

13. The system for improving accuracy of automatic categorization of financial transactions of claim 11, wherein
the one or more secondary financial transaction categorization parameters include a secondary financial transaction categorization generalized pricing parameter to automatically categorize the party financial transaction based, at least in part, on the payee associated with the party financial transaction and the amount of the party financial transaction as compared to how products and/or services of various kinds in various categories are typically priced.

14. The system for improving accuracy of automatic categorization of financial transactions of claim 11, wherein
the one or more secondary financial transaction categorization parameters include a secondary financial transaction categorization occurrence frequency parameter to automatically categorize the party financial transaction based, at least in part, on the payee associated with the party financial transaction and the number of party financial transactions having the same payee in a defined timeframe and/or the amounts of the party financial transactions.

15. The system for improving accuracy of automatic categorization of financial transactions of claim 11, wherein
the one or more secondary financial transaction categorization parameters include a secondary financial transaction categorization known services parameter to automatically categorize the party financial transaction based, at least in part, on the payee associated with the party financial transaction and on known services associated the payee associated with the party financial transaction as indicated by the merchant payee data.

16. The system for improving accuracy of automatic categorization of financial transactions of claim 11, wherein
the one or more secondary financial transaction categorization parameters include a secondary financial transaction categorization known pricing parameter to automatically categorize the party financial transaction based, at least in part, on the payee associated with the party financial transaction and on known pricing associated with the payee associated with the party financial transaction as indicated by the merchant payee data.

17. The system for improving accuracy of automatic categorization of financial transactions of claim 11, wherein
one or more of the secondary financial transaction categorization parameters are defined by a provider of the process for improving the accuracy of the automatic categorization of financial transactions.

18. The system for improving accuracy of automatic categorization of financial transactions of claim 11, wherein
one or more of the secondary financial transaction categorization parameters are defined by a party of the process for improving the accuracy of the automatic categorization of financial transactions.

19. The system for improving accuracy of automatic categorization of financial transactions of claim 11, wherein
the party financial transaction data is obtained from a financial institution.

20. The system for improving accuracy of automatic categorization of financial transactions of claim 11, wherein
the party financial transaction data is obtained from a financial management system.

* * * * *